Sept. 11, 1962   W. H. FAULKNER, JR., ETAL   3,053,983
RADIATION MONITORING
Filed Nov. 12, 1958
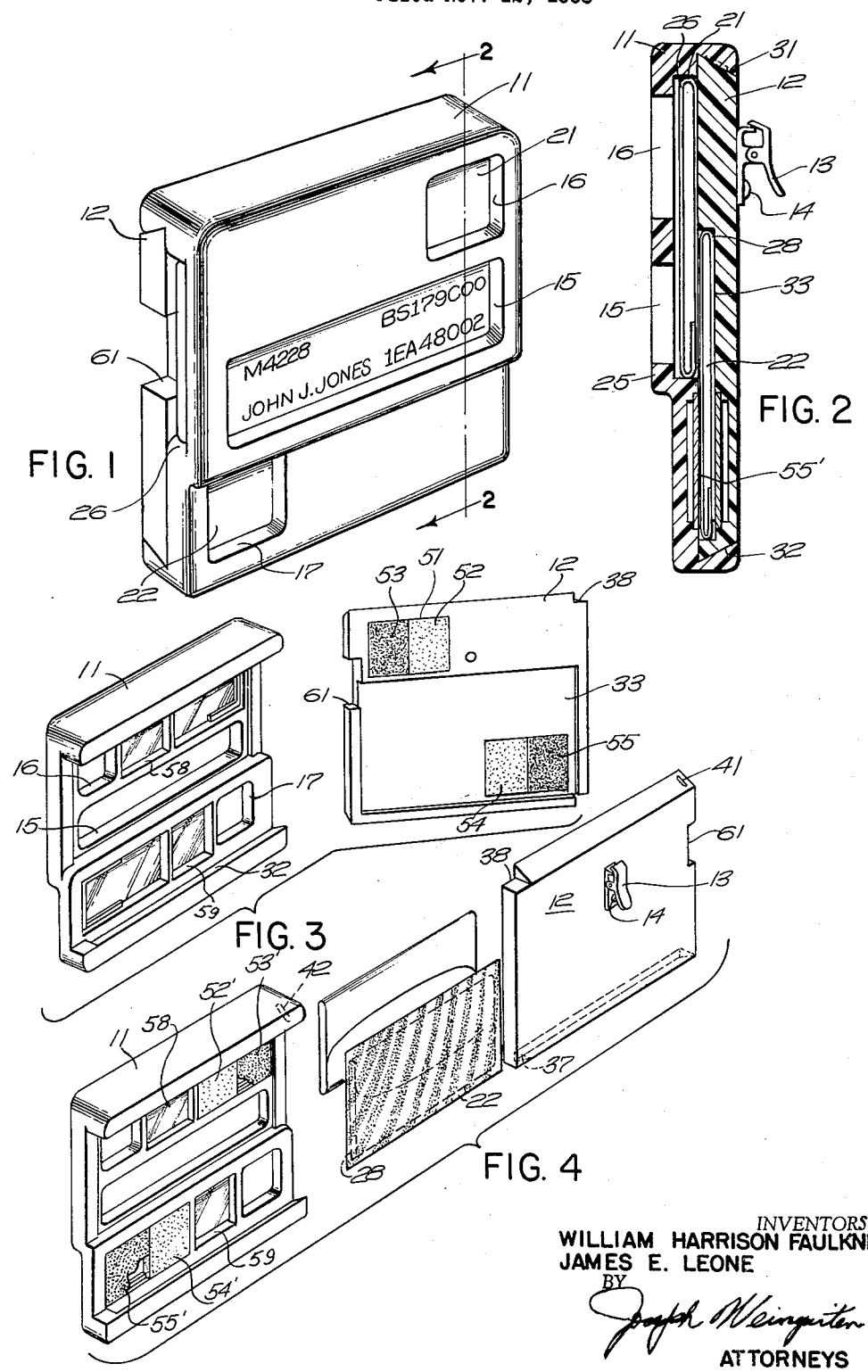
INVENTORS
WILLIAM HARRISON FAULKNER, JR
JAMES E. LEONE
BY
*Joseph Weingarten*
ATTORNEYS United States Patent Office 3,053,983
Patented Sept. 11, 1962

3,053,983
RADIATION MONITORING
William Harrison Faulkner, Jr., Weston, and James E.
Leone, Quincy, Mass., assignors, by mesne assignments,
to Laboratory for Electronics, Inc., Boston, Mass., a
corporation of Delaware
Filed Nov. 12, 1958, Ser. No. 773,381
11 Claims. (Cl. 250—83)

This invention relates in general to radiation monitoring devices and, in particular, to an improved film badge dosimeter providing an accurate indication of long-term cumulative dosage as well as short-term dosage.

In working with radioactive materials, operating personnel are often subject to various types of radiant energy. In order to adequately safeguard the health of such personnel, it is important that means be available for determining the amount, and also the intensity, of exposure to such radiation. One type of dosimeter which has been in widespread use for this purpose consists of a film holder which employs a light-tight packet containing multiple X-ray films as the radiation sensitive element, with which graduated filters are used to provide an indication of the quality and amount of energy striking the badge.

It has been the practice for the badge to be worn on the clothing of the operator for a predetermined period, for example a week. Thereafter the film is developed and examined with a densitometer to measure the dosage to which the wearer has been exposed during this period.

Since the number of people employed in any particular installation where a radiation hazard exists is usually so small as to make the processing and reading of this type of badge prohibitively expensive, organizations have been established to provide this service on a subscription basis. In the performance of this service, an unexposed film badge is sent to the customer for issue to a particular person, and after a designated period of use is returned to the service company for processing and a determination of the radiation to which the film has been exposed; a report then being sent to the customer.

From the nature and purpose of this service, several necessary characteristics of the film badge may be ascertained. A primary requirement is that of positive identification. Each badge and the film in it must be definitely determined as that issued to a particular wearer. Various means for marking have been devised, a good example being that described in Patent No. 2,831,119 which consists of marking the wrapper of the film packet with legible characters and simultaneously affecting the enclosed film so that upon exposure to a controlled dosage of X-radiation and subsequent development, the identical characters are displayed upon the films. The portion of the film so marked is, however, no longer useful as a dosage indicator.

Another characteristic of such a service is the requirement of frequent development and reporting. Since the service is to protect personnel, it must be rapid enough so that if a person is being exposed to unduly large amounts of radiation, he may be notified before serious harm is done. For this purpose the majority of such services have been operated on a weekly basis.

A third requirement is that the service provide an accurate indication of cumulative life-time dosage, since it is known that radiation dosage accumulated over the life of an individual constitutes a serious health hazard.

A film badge, of the type described above, employed in a service which is operated on a weekly basis however cannot adequately meet this third requirement. In such a service the cumulative life dosage is obtained by totalizing the dosages indicated on the weekly films. However, the threshold sensitivity, that is the effective background dosage level, of the film is sufficiently high that were it to be assessed against an individual's record every week he would have an indicated life dosage from this alone which would be a significant fraction of the allowable level. Since in fact the individual so assessed may have received no more than normal background radiation, which is ordinarly far less than film threshold, his record would contain many times the dosage actually received.

The present invention has therefore for a primary object the provision of a novel, compact, efficient film badge dosimeter of economical design which offers not only the customary short term protection but also furnishes an accurate indication of long term cumulative dosage.

It is another object of this invention to provide a novel film badge incorporating two separately removable film packets having means furnishing unmistakable identification of badge and films.

It is still another object of this invention to provide a film badge dosimeter offering short and long term dosage indication which is of novel mechanical configuration to preclude confusion while permitting rapid and economical service.

Broadly speaking, the present invention features a dual film badge in which two film packets are incorporated within a single housing. The film packets are so arranged within the housing that a portion of each overlaps the other. These overlapping areas, while no longer useful for dosage indication because of shadowing and penumbra effects, are utilized as positive identification areas on which information as to the wearer's identity and the period of use of the bade are described. The badge housing is provided with a window over the overlap area thus permitting ready observation of the identity information. This information is transcribed on the face of both film packets, so that the identification is visible whether one packet or two are in the badge.

The badge is constructed in such a way that one film packet may be readily removed by pushing it through the slot in which it rests, while the second film packet can only be removed by disassembling the housing.

Operationally the easily removable film packet serves as a weekly dosimeter being replaced every week by the customer who retains the badge housing while the second film packet remains undisturbed. At longer intervals, for example every three months, the customer returns the badge, receiving a replacement. The service organization then develops the film packet which had been retained for the entire three months as a cumulative dosage indicator. This novel technique considerably reduces the dosage which must be assessed against the individual's record in that the threshold sensitivity is the same for the three month period as it would be for a one week badge. This follows from the nature of the threshold sensitivity which is a characteristic of film chemistry substantially independent of period of exposure, and on this basis an individual who received only background radiation now would be assessed only one twelfth the amount he would have been assessed by the totalization of weekly badges.

One problem which has been encountered using commercially available film packets, as for example Du Pont 552, for long term dosage is that of latent image fading. This phenomenon can apparently be ascribed to variation of water content in the atmosphere. In the dosimeter of this invention, however, the long term film packet is enclosed in a water tight sealed envelope which virtually eliminates this effect.

Other objects and advantages of the present invention will now become apparent from the following detailed specification when taken in connection with the accompanying drawings in which:

FIG. 1 is a general perspective view of the assembled film badge of this invention;

FIG. 2 is a cross-sectional view taken along the line

2—2 of FIG. 1 illustrating certain internal details of the novel film badge;

FIG. 3 is a perspective view of the interior of the film badge illustrated in FIGS. 1 and 2; and FIG. 4 is an exploded perspective view of the film badge illustrated in the preceding figures.

With reference now to the drawing, FIG. 1 is a general perspective view of the novel film badge of this invention, which it may be seen is comprised principally of two plastic molded elements, namely a front housing 11 and a slidably removable rear cover 12. As shown in the cross-sectional view, the rear cover 12 of the badge is provided with a conventional spring clip 13 attached by a small rivet or pin 14, the clip serving to enable the user of the film badge to attach it to some article of clothing such as a shirt lapel or the like. The size of the badge disclosed in the drawing is of course a matter of design choice. However, since film packets of the type used in such badges are commercially available in standard sizes, the preferred size is that which incorporates two of these sensitive elements in the manner to be described in detail below.

As further illustrated in FIG. 1 the front housing 11 of this film badge is formed with three distinct openings, namely a relatively large rectangular central opening 15 which as will be described provides a visual identification area, and a pair of diagonally opposite small square openings 16 and 17 which permit unobstructed irradiation of the films in light tight packets 21 and 22, respectively, housed within the badge itself.

For an understanding of the manner in which the film packets 21 and 22 are disposed within the badge disclosed in the drawing, reference is now made to FIG. 2 for a discussion of the specific mechanical features of the housing 11 and rear cover 12. As illustrated, the front housing 11 is formed with an upper forward projection 25 of generally rectangular shape, which in turn is provided with a rectangular recess 26 adapted to receive the upper film packet 21. Front housing 11 is also provided with a pair of oppositely disposed, inwardly formed, confronting beveled edges 31 and 32 adapted to receive the mating beveled edges of rear cover 12. Thus rear cover 12 may be slideably removed from the front housing 11. Details of this configuration will be examined at a later point in the specification.

As illustrated in FIGS. 2 and 3 the rear cover 12 of the film badge is provided with a lower rectangular recess 33 of sufficient size and depth to accommodate the second film packet 22, the film packets 21 and 22 as illustrated being received in the respective recesses so as to overlap in the central area of the badge spanned by central opening 15 in the front housing 11. Film packet 22 is shown enclosed in plastic envelope 28 which effectively seals the films therein against the effects of water vapor, or other harmful vapors or gases.

Turning now to FIGS. 3 and 4, the cooperation between the front housing 11 and rear cover 12 may be examined in detail. More specifically these figures illustrate that the upper and lower beveled edges 31 and 32 of the front housing 11 are terminated at one end by the integral unbeveled portions 35 and 36, respectively, while small corresponding sections of the beveled edges of the rear cover 12 are removed as at 37 and 38. As a consequence, the rear cover 12 may be inserted into the housing 11 from the right hand side as viewed in FIGS. 3 and 4 and pushed to the point where the rear cover engages the uncut portions 35 and 36, whereby the cover will be in the fully closed position generally illustrated in FIG. 1. One or more integral small protrusions such as 41 are provided in cover 12 to mate with corresponding small recesses such as 42 in housing 11 to lock the cover 12 when in the position shown in FIG. 1. With sliding pressure this locking arrangement may be disengaged and the cover removed in the manner shown in the exploded view of FIG. 4.

As described earlier, the lower portion of film 21 and the upper portion of film 22 as apparent from FIGS. 1, 2 and 4, lie in overlapping relationship in the area of rectangular slot 15. This overlapping region of each film is used for identification purposes and is not significant insofar as the detection of absorbed radiation is concerned. The upper portion of film 21 and the lower portion of film 22 are used for monitoring purposes. In this connection each of these film areas is basically divided into four small subareas for monitoring specific types of radiant energy. Thus, the areas which fall immediately under windows 16 and 17 receive radiation unobstructed except for the small thickness of the wrapper which encloses the films in packets 21 and 22. A comparable area immediately to the left of window 16 and immediately to the right of window 17 as viewed in FIG. 1 receive radiation to the extent that it is passed by the plastic wall thickness of housing 11, this wall thickness being somewhat reduced by the square recesses 58 and 59 as shown in FIGS. 3 and 4. The remainder of the upper and lower film areas are, as will be described, sandwiched between respective pairs of metallic filters, which serve selectively to screen these areas of the film from radiations of predetermined nature.

The manner in which this selective radiation pattern is achieved is best illustrated in FIGS. 2, 3 and 4. Thus, the inner surface of the rear cover 12 is provided with a rectangular recess 51 in the upper left hand region as viewed in FIG. 3 in which a pair of small square metallic filters 52 and 53 are placed side by side. The rectangular recess 33 on the interior surface of cover 12 is also provided with a corresponding pair of small metallic filters 54 and 55. When the badge is assembled in the manner shown in FIG. 1, the filters 52, 53, 54 and 55 fall directly over a corresponding set of four filter elements 52′, 53′, 54′, and 55′, illustrated in FIG. 4.

As an illustration, filters 53 and 53′ and filters 55 and 55′ may comprise relatively thin sheets of copper, while filters 52 and 52′ and filters 54 and 54′ may be formed of thin cadmium. The exact purpose of these filters and the manner in which the developed films are interpreted will be discussed below.

Having discussed the general structural features of the novel film badge illustrated in the drawings, the manner in which this film badge is assembled and used will now be considered. Assume that the badge is in the open condition illustrated in FIG. 4, to assemble the structure the lower film packet 22 is first inserted into recess 33 in rear cover 12. The cover 12 is then slid into place between the beveled edges 31 and 32 of housing 11. As a final step film packet 21 is inserted into the recess 26 provided therefor in front housing 11 from either the right or left hand side of the badge. The depth of recess 26 is such that the film packet 21 will be frictionally retained between the front housing 11 and rear cover 12. Rectangular slot 61 enables the user to insert film packet 21 to a central position within the recess provided therefor.

In loading the film badge, care must be taken so that the overlap portions 63 and 64 of film packets 22 and 21 respectively fall in the manner shown in FIG. 4. Thus, these overlap regions lie in the identification area of the badge. As indicated previously, identification information is transcribed on both film packets, hence identification is always observable even when one or the other packet is temporarily removed from the badge. This identification area will normally carry the name of the wearer, the date of issuance and code information as to the type of film contained.

The badge described above is intended to monitor dosage from all types of radiation; however, when the expected radiation includes neutrons, a special film packet may be used which includes a neutron sensitive film. This packet may be of the same physical size as the standard packet and hence may be used in the badge described above.

Mention was made earlier of the selective absorption filters incorporated into the plastic badge housing. These metallic filters, together with the plastic window and open window, will provide a pattern of four distinct sectors on each exposed film. Interpretation of the differences in blackening of these sectors yields dosage information corrected for energy of the radiation. Thus the area which lies under the open window is exposed to all radiations, except alpha and very weak beta radiation which will be stopped by the paper wrapper. The immediately adjacent area which is shielded only by a thinned wall of plastic (preferably 1/16 inch thick) is sensitive to gamma and X-radiation and beta radiation of energy in excess of 1 mev. The copper filters pass some high energy gamma and high energy X-radiation, but absorb most of the low energy X-rays. The cadmium filters absorb a greater proportion of the gamma and X-radiation than the copper.

In order to interpret the dosage, the observed pattern of relative blackness on a particular film is compared to calibration curves which have been prepared from exposures to known energy radiation.

While the badge described copper and cadmium filter elements, it should be understood that other materials of varying density and thickness may be used instead, with appropriate calibration data as needed. In view of the fact therefore that numerous modifications and departures may now be made by those skilled in the art, the invention herein should be construed as limited only by the spirit and scope of the appended claims.

What is claimed is:

1. Radiation dosage monitoring apparatus comprising, a housing substantially enclosing first and second radiation sensitive film packets overlapping in respective limited areas whereby substantially areas of each are in non-overlapping relationship, said housing being arranged and formed to permit independent withdrawal of said first and second packets from said housing.

2. Radiation dosage monitoring apparatus comprising, a housing defining spaced independent compartments for substantially enclosing first and second radiation sensitive film packets, each of said film packets having a limited area thereof devoted to identification purposes, said housing being formed and arranged with means for supporting said first and second film packets in spaced relationship and partially overlapping in said limited region of said identification areas.

3. Radiation dosage monitoring apparatus comprising, a base structure supporting and substantially enclosing first and second separable means sensitive to penetrative radiations each having respective limited identification areas, said base structure being formed and arranged to support said first and second means in a manner exposing said limited identification area of said first means while concealing said limited identification area of said second means.

4. Radiation dosage monitoring apparatus as in claim 3 wherein said base structure is further arranged whereby separation of said first means therefrom exposes said identification area of said second means.

5. A film badge radiation dosimeter comprising, a generally rectangular housing having separable front and rear elements, said front element being formed with an identification window, means within said housing for retaining a first radiation sensitive film packet in a manner permitting slidable insertion and withdrawal thereof with a portion of said first packet exposed through said window, means within said housing for retaining a second radiation sensitive film packet in closely spaced parallel relationship with said first film packet in a manner whereby a portion of said second film packet is exposed through said window upon removal of said first film packet.

6. A film badge radiation dosimeter in accordance with claim 5 wherein said second film packet may be inserted or withdrawn from said housing only upon disassembly of said front and rear elements.

7. A film badge radiation dosimeter in accordance with claim 5 and including first and second openings in said front element respectively exposing limited portions of said first and second film packets other than those falling in the region of said window.

8. A film badge radiation dosimeter in accordance with claim 7 and including like coacting filter elements in said front and rear elements of said housing respectively disposed on opposite sides of said first and second films and sandwiching portions of said first and second film packets other than those falling in the regions of said window and said first and second openings.

9. A film badge radiation dosimeter comprising a housing formed of generally rectangular coacting front and rear elements, said front element being formed with a forwardly projecting portion and a pair of spaced rearwardly projecting extensions for slidably receiving said rear element, an identification window formed in said forwardly projecting portion of said front element and disposed centrally of said badge, said housing being adapted to receive and frictionally retain a first radiation sensitive film packet between said elements in the region of said forwardly projecting portion in a manner permitting slidable insertion and withdrawal from an edge of said housing, said first radiation sensitive packet when slidably inserted having a portion thereof exposed through said window, said rear element being formed with an inner recess having a raised boundary edge for receiving a second radiation sensitive film packet for retention closely adjacent to and in a plane parallel to said first film packet and with a portion thereof falling behind said first film packet in the region of said window, whereby said second film packet may be inserted or withdrawn from said badge only upon slidable separation of said front and rear elements.

10. A film badge radiation dosimeter in accordance with claim 9 wherein said front and rear elements of said housing are formed of plastic and including, first and second openings in said front element on opposite sides of said window for independently exposing respective portions of said first and second film packets to unattenuated radiations, first and second areas of reduced thickness of plastic in said front element on opposite sides of said window for independently exposing respective portions of said first and second film packets to radiations attenuated by said reduced thickness of plastic, and corresponding coacting filter elements in said front and rear elements on opposite sides of said window for sandwiching respective portions of said first and second film packets thereby attenuating selective radiations impinging thereon.

11. A radiation film badge dosimeter in accordance with claim 10 wherein said rear housing element is formed with a notch in an edge thereof for facilitating centering of said first film packet upon slidable insertion in said badge.

References Cited in the file of this patent

UNITED STATES PATENTS

| | | |
|---|---|---|
| 2,496,218 | Kieffer | Jan. 31, 1950 |
| 2,624,846 | Tochilin | Jan. 6, 1953 |
| 2,659,013 | Davis | Nov. 10, 1953 |
| 2,747,103 | Fairbank | May 22, 1956 |

FOREIGN PATENTS

| | | |
|---|---|---|
| 1,115,948 | France | Jan. 23, 1956 |

OTHER REFERENCES

Pardue et al.: Photographic Film as a Pocket Radiation Dosimeter, USAEC Technical Information Division, Oak Ridge (1948), MDDC–1065.

UNITED STATES PATENT OFFICE
CERTIFICATE OF CORRECTION

Patent No. 3,053,983            September 11, 1962

William Harrison Faulkner, Jr., et al.

It is hereby certified that error appears in the above numbered patent requiring correction and that the said Letters Patent should read as corrected below.

Column 5, line 35, for "substantially" read -- substantial --.

Signed and sealed this 5th day of March 1963.

(SEAL)
Attest:

ESTON G. JOHNSON
Attesting Officer

DAVID L. LADD
Commissioner of Patents